Feb. 7, 1961   J. H. FORKNER   2,970,920
FOOD PACKAGE
Filed Dec. 19, 1957
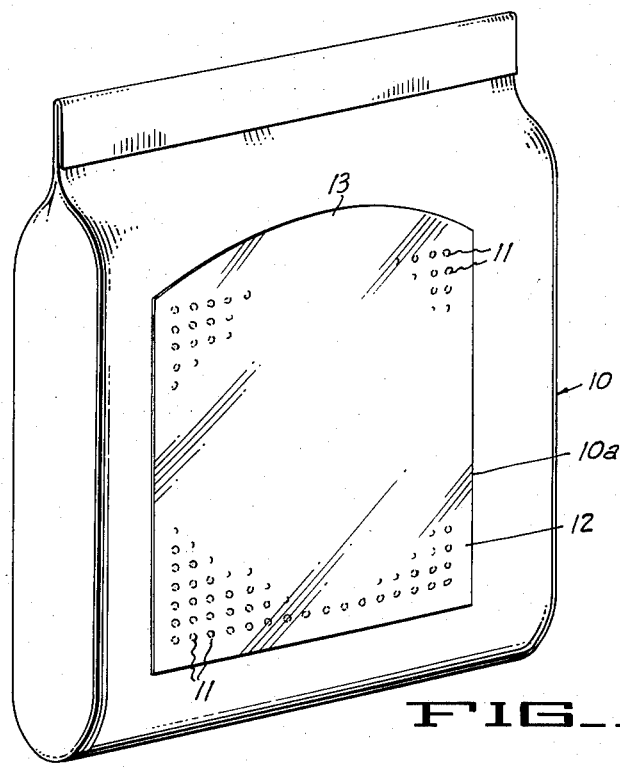
FIG_1_
FIG_2_
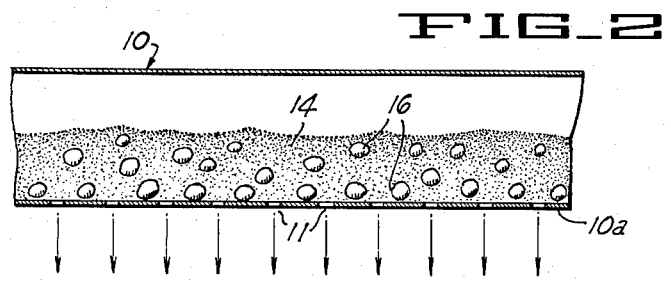
INVENTOR.
John H. Forkner
BY
ATTORNEYS

United States Patent Office 2,970,920
Patented Feb. 7, 1961

2,970,920

FOOD PACKAGE

John Hood Forkner, 6870 W. Herndon, Fresno, Calif.

Filed Dec. 19, 1957, Ser. No. 703,965

1 Claim. (Cl. 99—171)

This invention relates generally to food packages suitable for distribution to the domestic trade, and usable in a novel method for the preparation of food products.

Many food products are sold to the domestic trade in the form of dry powdered material, which the consumer mixes with liquid (e.g. water or milk) and possibly other ingredients. For example, desserts of the pectin or gelatin type are marketed in the form of dry powdered ingredients contained in bags or packages. The consumer mixes the dry powdered ingredients with water or milk, with or without further ingredients such as milk solids, flavoring and sweetening, and with or without heating, depending upon the character of the ingredients. Initially the mix may be quite fluid because of its high water content, but after setting or thickening, it is in the form of a moist semisolid. In connection with such products I have conceived the desirability of incorporating nonperishable and low moisture content fragments or masses, particularly normally dry fragments capable of absorbing moisture to form tender or gel-like masses of distinct flavor. By way of example, reference can be made to fragments comprising sugar, stabilizer and flavoring components. When such fragments are introduced into mixes of the type referred to above, before thickening or settling, the fragments are subject to dissolution and loss of flavor, which effects are accelerated by heating. Also the fragments tend to separate out from the fluid material, thus providing poor distribution after setting. Many formulas for the preparation of such mixes call for the use of mechanical mixing or beating devices. When such fragments are introduced into the mix prior or in conjunction with the use of mechanical mixing devices, the fragments may be crushed to lose their identity. I have found that the undesirable effects upon the fragments referred to above can be overcome when the fragments are introduced into the mix at the time the mix is setting up as a semisolid, and after the mix has cooled if heated during formulation, and after the use of mechanical mixing devices. Assuming that the ingredients are to be sold in packaged form (i.e. as a premix), introduction of the fragments at the proper time indicated above, would ordinarily require the use of separate packages, one for the powdered ingredients, and one for the larger fragments.

In general it is an object of the present invention to provide a new article of manufacture in the form of a package which contains both the powdered ingredients and larger fragments, but which facilitates the incorporation of the fragments into the final product in such a manner as to avoid the undesirable effects described above.

Another object of the invention is to provide a novel package which contains both the dry powdered ingredients and the larger dry fragments, in intimate contact, but which permits the dry powdered materials to be rapidly and separately discharged from the package whereby such materials can be incorporated with liquid ingredients to form moist semisolid material, and the separate fragments incorporated with such material after preliminary preparatory operations.

Another object of the invention is to provide the packaged ingredients in such physical form that relatively large holes can be used to discharge the powdered fraction, thus increasing the ease and speed with which such fractions can be discharged. In practice this is accomplished by using puffed masses for the larger fragments.

Another object of the invention is to provide a novel method making use of the foregoing package.

Additional objects and features of the present invention will appear from the following description in which the preferred embodiment has been set forth in detail in conjunction with the accompanying drawing.

Referring to the drawing:

Figure 1 is a perspective view showing a package in accordance with the present invention.

Figure 2 is an enlarged cross sectional view showing how powdered ingredients are selectively sifted from the package.

In accordance with the present invention I provide a package having normally closed sifting openings in one or more walls of the same. This package contains both powdered ingredients which can be sifted through the openings, and larger puffed fragments which are of such a size that they will not pass through the openings. The domestic consumer opens the sifting perforations or openings, as by pulling away a closure strip, after which the dry powdered ingredients are sifted from the package. These ingredients are then incorporated with water or milk, and possibly other ingredients, to form a moist semisolid product. Then the larger puffed fragments are removed from the package and incorporated in the semisolid material, taking care not to use sufficient agitation to cause breakage or crushing. The puffed fragments are of such a character that they readily absorb moisture to form tender or gel-like masses of distinctive flavor. The puffed fragments are of substantial size in proportion to their weight, thus making possible the use of sifting openings of substantial size through which the powdered material readily passes. Thus I prefer that the bulk density of the fragments be of the order of 50% or less of the density of the powdered material.

Figure 1 of the drawing illustrates a package in accordance with the present invention. It consists of a bag or envelope 10 formed of suitable material such as wax paper, moist proof cellophane, polyethylene, Pliofilm, Saran, or the like. One side wall 10a is provided with a plurality of sifting perforations 11, which are normally closed by the removable strip 12. This strip may be retained in place by pressure sensitive adhesive, or it may be heat sealed about its margins in such a manner as to permit it to be readily stripped away. The tab 13 can be left free to facilitate its removal. The interior of the bag contains dry powdered ingredients 14, together with puffed fragments 16 of substantial size.

In a typical instance the dry powdered ingredients 14 comprise all or the more important ingredients required to prepare a moist product in semisolid form, such as a jelly dessert. Thus it may comprise pectin, gelatin, and/or pregelatinized starch, as a gel forming agent, together with a sweetening agent like sucrose. Also it may contain dry solids such as spray dried skim milk. Depending upon the ingredients employed, heating may or may not be required during formulation. While the particle size of such dry powdered ingredients may vary widely, it should be such that the powder readily passes through the openings 11.

The fragments 16 should have a distinctive flavoring, with or without contrasting coloring. In the package the moisture content should be relatively low, as for example, 5% or less, to prevent spoilage. However, when contacted with water such fragments should absorb moisture to the extent of forming a tender gel-like mass in the final product. The use of fragments 16 which are puffed or cellular in form, whereby their size is relatively large compared to their weight, facilitates the use of light weight fragments having a size substantially larger than the openings 11, while at the same time permitting the use of openings that are sufficiently large for readily passing the powdered ingredients. In addition the low bulk density thereby provided (e.g. 50% that of the powder) facilitates separation under agitation, as will be presently explained.

Puffed or cellular fragments can be formed by the use of certain ingredients and by subjecting the material to vacuumizing during processing. With respect to the formulation of these fragments, particular reference can be made to the use of certain reducing sugars, such as glucose, fructose, dextrin and maltose to obtain the desired expansion under vacuum. Maltose, together with one or more other reducing sugars, has given good results. Flavoring can be incorporated in the ingredients from which the fragments are made, or can be applied to the surfaces of the fragments after their production in expanded condition.

In my copending application, Serial No. 659,517, filed May 16, 1957, and entitled "Food Products and Method of Manufacture," I have disclosed a type of cellular or puffed fragment which can be used with the present invention. In that instance the formulation and the processing are such as to produce generally spherical shaped fragments having a relatively smooth exterior skin, with a cellular or spongelike interior. The formulation includes a reducing sugar and a stabilizer like pregelatinized starch. Fragments containing such ingredients are heated and subjected to a high vacuum whereby they are puffed and dehydrated. By submerging the fragments in a dry divided separating and supporting medium like starch, before vacuumizing, the surfaces of the expanded fragments are caused to be rounded.

Specific examples of my invention are as follows:

Example 1

A bag was made substantially as illustrated in Figure 1, from wax paper. The closure strip 12 was formed of wax paper and was retained in place by pressure sensitive adhesive. The sifting perforations 11 were approximately 1/16 inch in diameter. The package was about one half filled with a mixture comprising dry powdered gelatin, and the larger fragments 16.

The fragments 16 were formulated from ingredients as follows:

| | |
|---|---|
| Corn syrup | gms 27 |
| Malt syrup | gms 4 |
| Concentrated raspberries | gms 2 |
| Coconut stabilizer | gms 3 |
| Powdered skim milk | gms 10 |
| Pregelatinized starch | gms 8 |
| Sodium caseinate | gms 1.5 |
| Coating starch | gms 5 |
| Raspberry coloring | gms .05 |

Plus raspberry flavoring.

The corn syrup, malt syrup, concentrated berries and artificial coloring were mixed and boiled to concentrate the same to about 87% solids. The coconut, powdered milk, starch and sodium caseinate were preheated to about 130° F. and then added. The coconut stabilizer was finely divided coconut cellulose from which the oil had been largely removed. After adding the flavoring, the homogeneous material was formed into a slab and chilled to about 0° F. The hard brittle and nonsticky slab was cracked to produce fragments passing through a No. 6 screen and remaining on a No. 12 screen. Such fragments (by weight) were mixed with 20 parts corn starch, and this mixture placed in pans to produce a layer about 1½ inches deep. The pans were placed upon shelves of a vacuum dehydrator heated by water at a temperature of about 170° F., whereby the pans and contents were heated to a temperature level of about 165° F. A vacuum equal to 29 inches mercury column was applied and maintained for two hours. After vacuumizing the starch was removed through a No. 12 screen, and remaining masses sprayed with citrus oil comprising 4 ounces lemon oil and 1 pound orange oil, and permitted to set for 48 hours. The citrus oil served to heighten the flavor and impart a fruity odor. The fragments or masses thus sustained had a moisture content of about 5%, and had an average diameter ranging from about 1/8 to 3/8 of an inch.

The bag employed was intended to contain about 6 ounces of material when filled. Only about half this amount of material was introduced into the bag, thereby providing a package such that the contents could be agitated by shaking for rapid sifting. About 3/4 of the bulk of the total contents was formed by the powdered ingredients, and the other 1/4 by the expanded fragments. The finely divided material in the bag was sufficient to fill the voids between the expanded masses, thus protecting the larger fragments from crushing. The bulk density of the powder was about twice that of the puffed fragments.

The package described above was used as follows: Cover strip 12 was removed and the powdered gelatin sifted through the openings 11. A lemon gelatin dessert was prepared according to a conventional gelatin dessert formula, and permitted to cool. After the material started to set up as a gel, the bag was torn open and the expanded fragments introduced into the gel. By simple stirring the fragments were distributed relatively uniformly through the body of the gel. After a further setting period of about 20 minutes, the expanded fragments had absorbed moisture in the manner described in my aforesaid copending application, to form tender and gel-like masses of distinctive flavoring. These masses retained their identity as such within the gel-like material formed by the powdered ingredients.

Example 2

Except for its size, the package was the same as used in Example 1. However, the dry powdered ingredients comprised 6½ ounces (by weight) of a mixture as follows:

| | Percent (wt.) |
|---|---|
| Dried egg white | 2.94 |
| Salt | 0.15 |
| Cream of tartar | 0.49 |
| Calcium tartrate | 0.15 |
| Corn syrup solids | 17.80 |
| Cellulose gum | 0.26 |
| Pregelatinized potato starch | 2.22 |
| Powdered sugar (sucrose) | 75.63 |
| Powdered vanilla (imitation) | 0.36 |
| Total | 100.00 |

The puffed fragments employed were the same as in Example 1. However the proportioning (by volume) was such that of the total volume of material within the package, 95% comprised the powdered material and 5% the expanded fragments. The package was used to produce a cake icing. Upon removing the covering strip 12, the powdered ingredients were quickly sifted out into a suitable container. One half cup of water was added to the dry ingredients to produce a wet mix. This mix was beaten to form a stiff whip, after which it was deposited upon top of a cake in the customary manner. The expanded fragments 16 were then removed from the package and deposited upon top of the icing. Over a period of about 20 minutes, the puffed fragments absorbed moisture to become tender gel-like masses.

It will be evident that the present invention is capable of wide variation with respect to the ingredients employed, including both the powdered ingredients, and the formulation of the fragments 16. Special flavoring can be incorporated into both the powdered ingredients and the expanded fragments. Powdered ingredients can be such as to form any one of several types of moist semisolid products, including jelly like desserts, cakes, and icings. The fragments 16 can be either dispersed in the body of the moist semisolid material, or deposited on an exterior surface, as previously described. Likewise the fragments can vary widely as to formulation, and with respect to the flavoring of the same. Thus I can use such flavoring ingredients as natural fruit juices, artificial fruit flavorings and extracts. Also I can employ nut flavorings like coconut, so-called mint flavorings, and chocolate. In addition to the foregoing, my invention can be used for a frozen dessert premix, where the package contains dry powdered ingredients suitable for the preparation of a dessert such as ice cream, together with larger puffed fragments for incorporation into the frozen material after the customary freezing and mixing operations. Introduction after mechanical agitation (i.e. churning) of the frozen material avoids mechanical disintegration and dissolution of the puffed fragments.

As applied to so-called cake premixes, the package is advantageous in that the powdered ingredients are first intermixed to form the desired cake batter, and then the puffed fragments added whereby a finer, more tender cake structure is provided than would be afforded if the fragments were initially added with the powdered ingredients and caused to progress through mixing and beating operations. With reference to cake icing mixes, it is well known that they require a substantial amount of agitation or beating for aeration. Incorporation of puffed fragments into the material prior to such beating would cause them to be mechanically disintegrated. The present package therefore facilitates introduction of the puffed fragments at a proper time in the preparation of the icing, thus maintaining the identity of these fragments both as to physical shape and flavoring, in the final product. Instead of intermixing the puffed fragments with the icing, the fragments can be sprinkled upon the icing to be partially embedded therein.

In general my invention permits the sale of ingredients in a single package, with the package and the ingredients formed in such a manner that the powdered ingredients can be readily removed by sifting, leaving the larger puffed or expanded fragments within the package for subsequent use. Sale of both the powdered ingredients and the puffed fragments in the same package is desirable because the powdered material serves to protect the fragments against crushing, and because a single package is more economical. As previously stated, the use of puffed fragments permits use of larger openings which in turn make possible rapid discharge of the powdered fraction. If one should attempt the use of the same fragments without puffing, the reduced size difference and lack of rounded form would require smaller sifting holes, which in turn would greatly increase the time required to discharge the powdered fraction, and in general would make the sifting operation troublesome and inconvenient.

Because of the great difference in bulk density, a natural separation takes place during agitation, with the puffed fragments tending to rise and float upon top of the powder. This natural separating action aids rapid discharge of the powder, particularly in that blocking of the holes by the larger fragments is avoided.

It will be evident that my package facilitates avoiding the detrimental effects previously described. The larger puffed fragments are retained until setting or thickening of the mix has commenced, and they are introduced after the mix has cooled following any heating, and after any agitation by mixing devices such as would crush the fragments. With incorporation of the fragments after setting or thickening, the fragments maintain an optimum distribution in the mix, although they absorb moisture to form tender gel-like masses, as previously described.

In the foregoing example, it is stated that the package was about one half filled with the dry mixture comprising the puffed fragments and powder. This is a desirable feature because if the package contains substantially greater amounts of the material, the limited free space would seriously interfere with agitation and the previously described natural separating action, thus preventing the desired rapid discharge of the powder, with retention of the puffed fragments.

A dessert made in accordance with the present invention has certain desirable characteristics. The puffed fragments are in the form of tender gel-like masses. Assuming that the fragments were given a characteristic flavoring, this flavoring is retained within the gel-like masses, and is not diffused throughout the entire mass. Furthermore any distinctive coloring originally given to the fragments is retained in the gel-like masses, due to the substantial absence of dissolution or crushing during preparation.

With ingredients of the type mentioned, it is desirable for the package to be moisture proof, thus avoiding deterioration by absorption of atmospheric moisture. The dry powdered material, in intimate contact with the puffed fragments, also aids in preventing moisture absorption because it functions as a desiccant.

I claim:

As a new article of manufacture for preparing a gel-like food product, a package having sifting openings in one side wall of the same and containing edible powdered ingredients that can be rapidly discharged through said openings, together with dry edible expanded fragments that are cellular in form and which have a size by virtue of such cellular form that they cannot pass through said openings, readily removable means for maintaining said openings normally closed, the bulk density of the fragments being substantially less than that of the powder, the fragments being hydratable to form tender masses and having a flavor differing from the flavor of the powdered ingredients, the powdered ingredients including a gel-forming agent and forming a moist gel-like material when incorporated with water, the fragments being capable of separate incorporation with such moist gel-like material to thereby form a consumer product in which the fragments are identifiable as tender masses of distinct flavoring.

References Cited in the file of this patent

UNITED STATES PATENTS

| | | |
|---|---|---|
| 1,263,434 | King | Apr. 23, 1918 |
| 2,022,467 | Heyman | Nov. 26, 1935 |
| 2,288,409 | Lippman | June 30, 1942 |
| 2,776,787 | Nicol | Jan. 8, 1957 |